Figure 1:
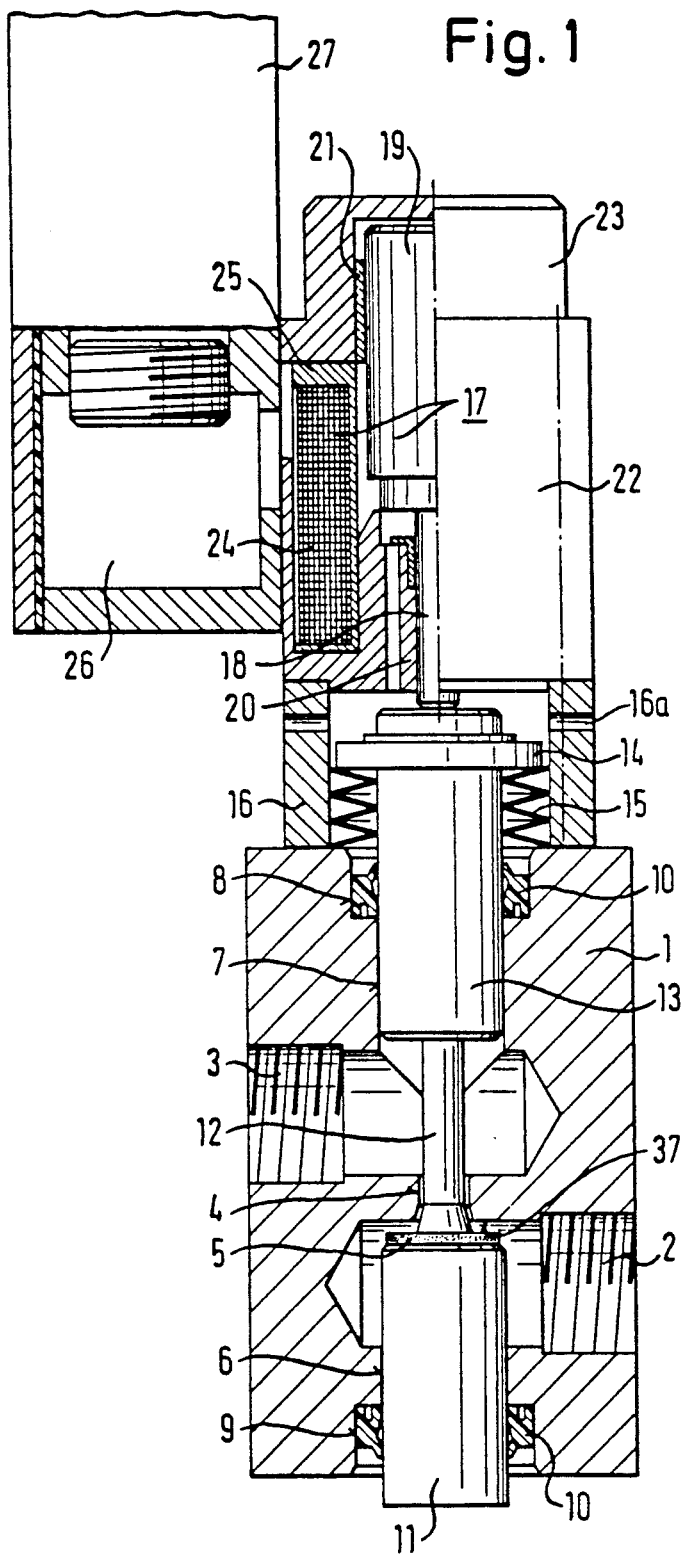

United States Patent [19]
Stroh

[11] Patent Number: 5,267,721
[45] Date of Patent: Dec. 7, 1993

[54] VALVE MEANS, IN PARTICULAR FOR RETURNING FUEL VAPOR

[75] Inventor: Willfried Stroh, Egelsbach, Fed. Rep. of Germany

[73] Assignee: Ross Europa GmbH, Langen, Fed. Rep. of Germany

[21] Appl. No.: 900,687

[22] Filed: Jun. 17, 1992

[30] Foreign Application Priority Data

Jun. 19, 1991 [DE] Fed. Rep. of Germany ....... 4120273
Feb. 7, 1992 [DE] Fed. Rep. of Germany ....... 4203620

[51] Int. Cl.$^5$ .............................................. F16K 47/08
[52] U.S. Cl. .................................... 251/121; 251/282; 251/291; 251/335.3
[58] Field of Search ............... 251/118, 121, 210, 282, 251/291, 335.3

[56] References Cited

U.S. PATENT DOCUMENTS

| | | | |
|---|---|---|---|
| Re. 25,251 | 10/1962 | Quail | 251/282 X |
| 600,249 | 3/1898 | Parsells | 251/335.3 X |
| 1,153,681 | 9/1915 | Fulton | 251/282 X |
| 1,861,916 | 6/1932 | Hennebohle | 251/282 |
| 2,617,621 | 11/1952 | Hobbs | 251/335.3 X |
| 3,179,123 | 4/1965 | Kowalski et al. | 137/495 |
| 3,304,048 | 2/1967 | Roberts | 251/282 X |
| 3,368,791 | 2/1968 | Wells | 251/129.07 |
| 3,985,333 | 10/1976 | Paulsen | 251/282 X |
| 4,295,505 | 10/1981 | Hasselmann et al. | 251/282 X |
| 4,662,605 | 5/1987 | Garcia | 251/129.08 |
| 4,860,715 | 8/1989 | Hiraku et al. | 123/519 |

FOREIGN PATENT DOCUMENTS

| | | |
|---|---|---|
| 0320645 | 6/1989 | European Pat. Off. |
| 2329639 | 1/1975 | Fed. Rep. of Germany |
| 2522454 | 12/1975 | Fed. Rep. of Germany |
| 3006576 | 9/1980 | Fed. Rep. of Germany |
| 3414548 | 10/1987 | Fed. Rep. of Germany |
| 8717378 | 10/1988 | Fed. Rep. of Germany |
| 9011455 | 11/1990 | Fed. Rep. of Germany |
| 2094441A | 9/1982 | United Kingdom |

*Primary Examiner*—John Rivell
*Attorney, Agent, or Firm*—Harness, Dickey & Pierce

[57] ABSTRACT

The present invention relates to a proportional valve, in particular for fuel dispensing systems, to recover fuel vapor to the gas station tank. According to the invention the valve member is defined by a tandem piston arrangement to increase safety and accuracy in controlling the vapor volume to be recovered. The invention further relates to a valve arrangement for fuel dispensing systems having a plurality of fuel nozzles.

18 Claims, 4 Drawing Sheets

VALVE MEANS, IN PARTICULAR FOR RETURNING FUEL VAPOR

The present invention relates to a proportional valve and in particular to a fuel delivery system to recover fuel vapor in a fuel delivery line to a fuel tank in combination with a proportional valve.

Proportional valves are widely used to control the pressure and/or the volumetric rate of a fluid. Generally, the actuating means of the valve member is defined as a proportionally working solenoid to adjust the valve member such that the pressure of flow rate of the fluid is proportional to the input signal of the solenoid.

The present invention contemplates to recover the aggressive and noxious fuel vapors emitted from the fuel delivery line used for delivering gasoline to the fuel tank of a vehicle by means of a proportional valve which is controlled to return the vapor to a tank in the station in proportion to the liquid fuel passing through the delivery line. An optimum precise controlling, in particular a small hysteresis of the valve is required to avoid an inadmissible pressure increase in the station tank caused by the recovered fuel vapor. A further problem arises from the fact that a proportional valve of this type shall be used both with older stations equipped with mechanically operating meters and with modern gas stations having electronically operating meters. Furthermore, the proportional valve for particular application must be designed to be explosion-proof with a view to the highly explosive gasoline vapor and must be suited to be mounted in adverse environmental conditions such as in the lower space of gas stations which are not protected against moisture.

Accordingly, it is an object of the invention to provide a proportional valve which can be used in gas stations for the recovery of fuel vapor.

It is a further object to provide a proportional valve having a high accuracy of controlling the vapor. It is still a further object of the present invention to provide a fuel delivery system incorporating a proportional valve to be connected to a plurality of fuel delivery lines. According to the invention the tandem piston arrangement is provided resulting in a very accurate central guiding of the valve member to reduce the eccentric forces acting thereon. More specifically, the valve according to the invention has an extremely small hysteresis. This is improved by the special sealing means of the piston in the valve housing and by antifriction guiding faces of the seal.

The throttle area provided between the passage and the connecting rod of the tandem pistons limits the volumetric flow of fluid through the passage even when the valve is fully opened which prevents a high pressure increase in the tank when the valve is applied to a fuel dispensing station.

The tandem piston is actuated through a force transmitting member, such as a plunger which allows for easily selecting an electromagnetical, mechanical or fluid operated actuating means.

Preferably, the valve housing and the actuating means are separated from each other by an intermediate body defining a geometrical and thermical isolation.

The proportional valve according to the invention is particularly useful to be mounted in fuel gas stations equipped with a vapor recovery system. The proportional valve is suited to be operated in combination with mechanical or electronical fuel meters, the system incorporating the proportional valve is explosion-proof and easy to mount in severe environmental conditions.

Furthermore, according to the present invention the proportional valve is mounted in combination with a plurality of fuel delivery hoses. Accordingly, the individual vapor recovery lines of the various fuel delivery hoses are connected to the proportional valve through a shut-off valve for each. The shut-off valve is suited to completely block the vapor recovery line. More specifically, the shut-off valve associated with the delivery of fuel is in the open position to provide an optimum vapor recovery and a vapor volume control which is performed by the proportional valve. A fuel dispensing from the remaining fuel hoses is shut off. The design of the shut-off valves is unique with respect to sealing function, geometrical structure and safety of operation. In this respect it is referred to the features of the subclaims. The shut-off valves are easy to mount and easily fit to prior fuel dispensors.

Figure 2:
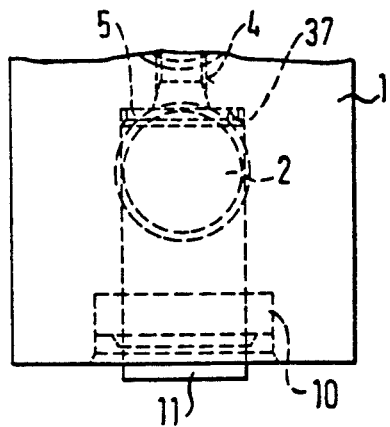
Figure 3:
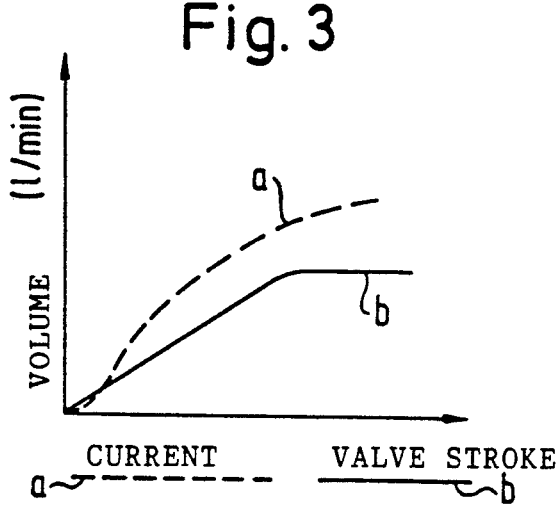
Figure 4:
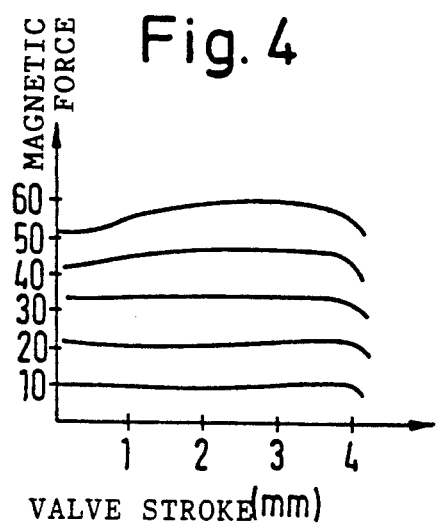
Figure 5:
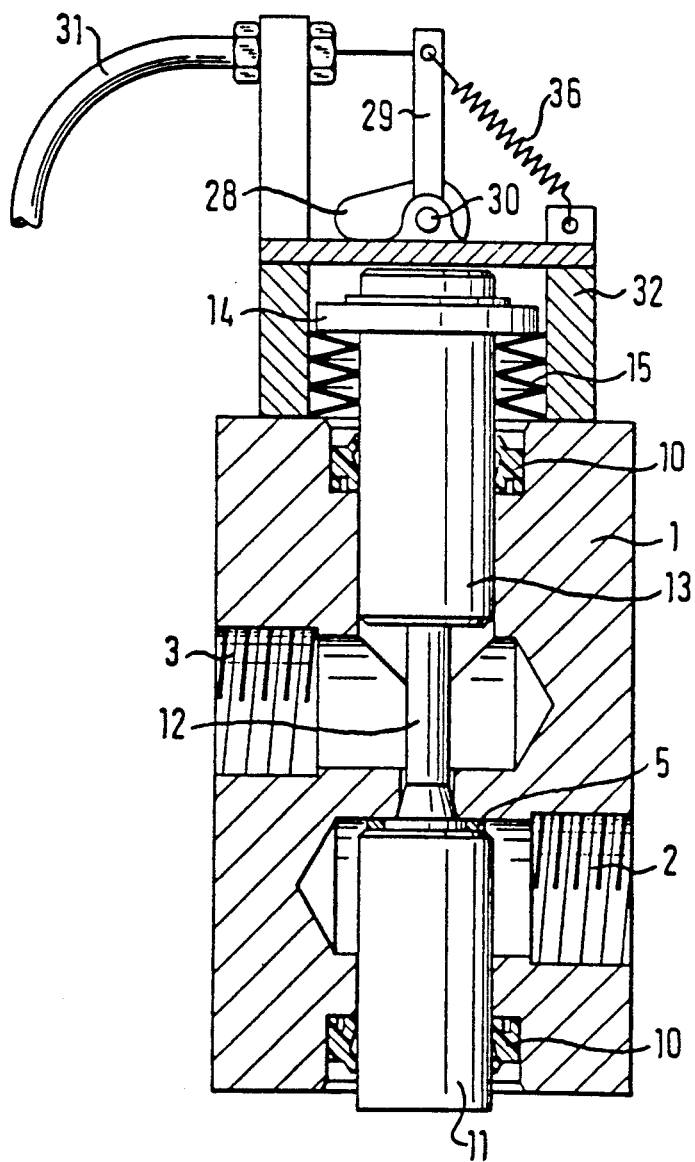
Figure 6:
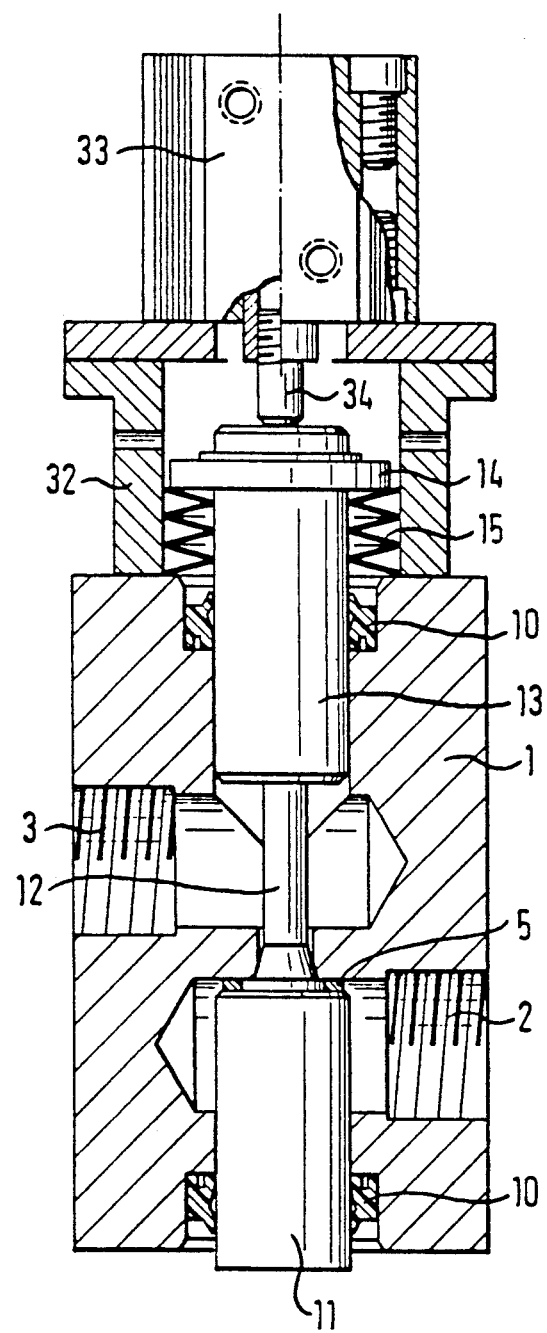
Figure 7:
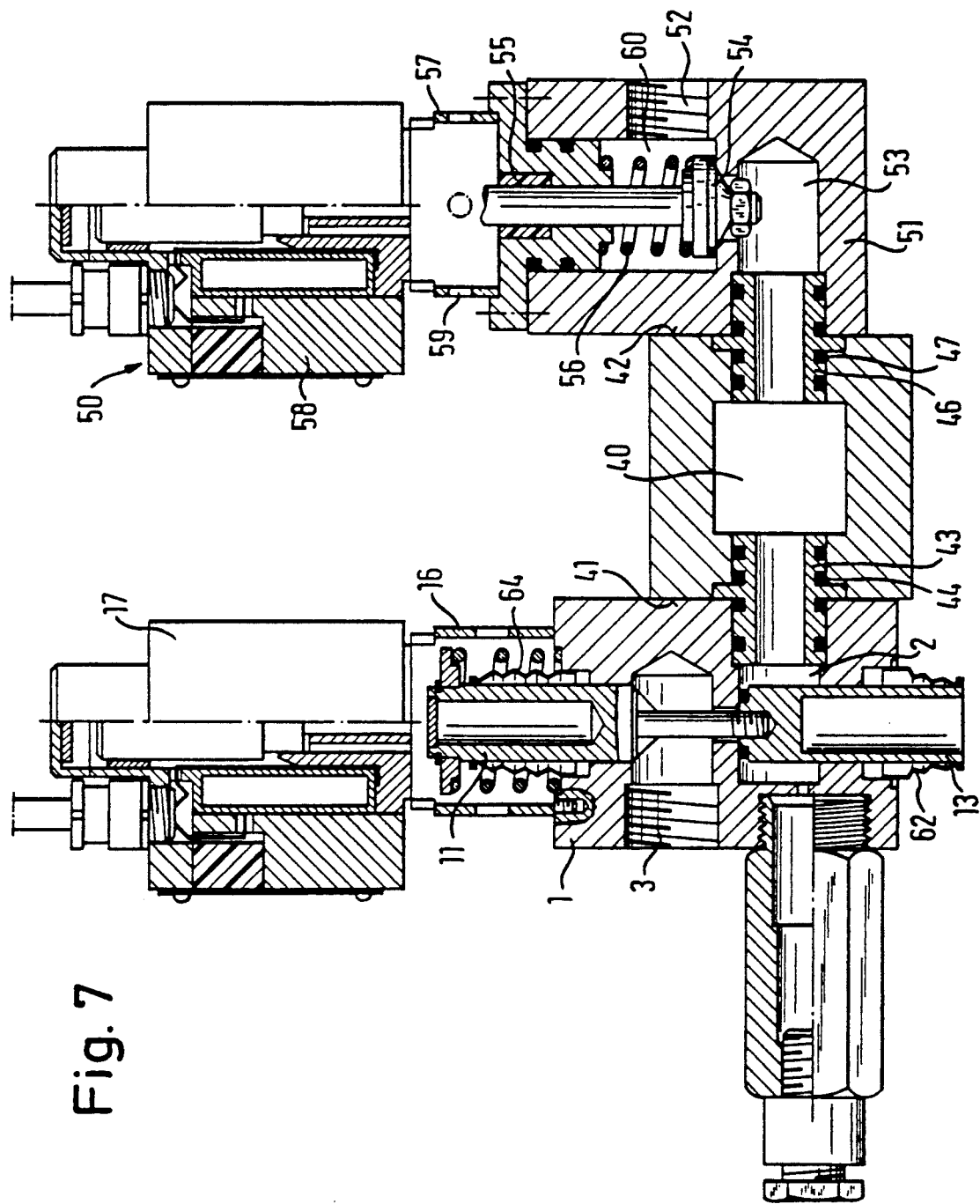

In order that the invention may be fully understood, preferred embodiments of the invention will now be described, by way of example, with reference to the accompanying drawings. The drawings show:

FIG. 1: a section through a proportional valve incorporating a solenoid,

FIG. 2: a side view of the lower section of the valve housing shown in FIG. 1,

FIG. 3: a diagramm of the volumetric rate in response to the solenoid input signal or, respectively, the valve stroke, FIG. 4: a diagramm showing the magnetic force in response to the valve stroke, FIG. 5: a section of a proportional valve including a mechanical actuation, FIG. 6: a section of a proportional valve including a fluid operated actuation and FIG. 7: a valve arrangement for a plurality of shut-off valves in combination with a proportional valve according to FIG. 1.

The proportional valve shown in FIG. 1, 5 and 6 comprises a valve housing 1, having an inlet port 2 and an outlet port 3 defined by axially offset bores which are connected by a vertical passage or through-opening 4, having a cross-sectional area to be controlled. The inlet and outlet ports 2,3 are provided to threadably fit to fittings not shown but may be designed to fit to plug-in-couplings or the like as well.

The lower side of the passage is flat to provide a valve seat 37 (see FIG. 2). On either side of the passage 4, and concentrically thereto, cylindrical bore 6,7 is arranged each having a common axis which is normal with respect to the axes of the bores defining the inlet and outlet ports 2,3.

Annular recesses 8,9 each receive a sealing element 10 provided in the outer end of each bore 6,7. Each sealing element 10 is provided with a pair of sealing edges. The annular wedge-like recess between both the sealing edges is filled with a lubricate to decrease the friction. The bores 6,7 receive a tandem piston arrangement comprising a lower piston 11 and an upper piston 13, which are connected by a connecting rod 12 which is secured to the pistons by cementing, for example.

Both pistons 11,13 are guided fluid-tight by the seals 10 in the bores 6,7. The lower piston 11 extends through the housing 1 so that its lower face is subjected to atmosphere.

The opposite head face of the piston 11 is provided with an annular valve seal 5 cooperating with the valve seat 37. The valve seal 5 comprises a resilient plastic sealing ring which is secured to the head face of the piston 11 by means of a metallic disk. The valve housing 1 is made of a harder material than the resilient sealing 5 such that the seal 5 cooperates with the valve seat 37 to close the passage 4 in a best possible way.

As shown in FIG. 1, the part of the connecting rod adjacent the piston 11 is provided with a tapered sealing face cooperating with a tapered sealing face in the lower portion of the passage 4. When the tandem piston arrangement 11, 13 is moved from the open position shown in FIG. 1 upwardly into its closing position, the passage 4 is closed by the sealing 5 contacting the valve seat 37 and in addition thereto by the sealing faces of the connecting rod 12 and the passage contacting each other. The twofold seal provided in series results in a high safety with respect to a tight closing of the valve.

Between the connecting rod and the passage 4 there is an annular gap through which the fluid passes from the inlet port 2 into the outlet port 3 when the valve is open. This annular gap is determined such that it defines a throttle in the maximum opening position of the pistons 11,13 to very accurately limit the volumetric rate of fluid there-through.

The bores 6,7 bear an antifriction surface coating, for example, a chemical nickle coating. This coating can be replaced by a guide sleeve inserted in the bore 6,7. In addition the cylindrical faces of both pistons 11,13 may be provided with an antifriction coating, such as a nickle-coating, including polytetrafluorethylene. A lower friction results in a small hysteresis of the proportional valve.

The upper piston 13 extends through the housing 1 upwardly through an intermediate body 16 which is attached to the housing. Opening 16a in the intermediate body 16 provides an access to atmosphere to the upper head face of the piston 13, whereas the lower face of the piston 13 is subjected to the pressure in the outlet port 3. Pistons 11,13 have an equal diameter so that the piston faces subjected to fluid pressure have equal areas.

The piston is biased towards closing position by a resetting element defined by a spring 15. The spring 15 preferably is a Belleville type spring or a coiled spring made of stainless steel which is provided between the upper side of the housing 1 and an annular flange 14 of the piston 13, the body 16 serving to guide and centering the spring 15.

An actuator is removably attached to the upper side of the body 16, comprising a force transmitting member 18 shaped as a plunger to engage the upper side of the piston 13 in a manner to exert minimum eccentric forces thereto.

FIG. 1 shows the actuator to be defined by a proportional solenoid 17 while FIG. 5 shows a mechanical actuator and FIG. 6 a fluid operated actuator.

The solenoid 17 shown in FIG. 1 comprises an armature 19 and a winding 24 which are accomodated in a housing 22 including a cover 23. A ring 25 holds the winding 14 in the casing. The plunger 18 and the armature 19 are guided in a sliding bearing 20,21. An electrical connection 26,27 is provided.

The operation is as follows: The tandem piston arrangement 11,13 is biased by the spring 15 into the closing position in which the passage 4 is closed by the twofold series sealing arrangement as indicated above. When a signal is applied to the solenoid 17 the pistons 11,13 are moved downwardly towards the open position. The opening stroke of the piston 11 and thus the volumetric rate through the passage 4 is proportional to the current signal applied to the solenoid.

FIG. 3 shows a volumetric rate diagramm. Accordingly, curve a illustrates the volume passing through the passage 4 in response to the input current and curve b shows the volume in response to the valve stroke. The curves may be adapted to particular requirements by selecting the passage 4 and/or the shape of the connecting rod 11.

FIG. 4 shows magnetic force curves of the solenoid in response to the valve stroke and the current when the voltage is maintained constant.

FIG. 5 shows a mechanical actuator comprising a cam drive including a cam 28 which is rotated about a shaft 30 by a lever 29 fixed to the cam. The lever 29 is actuated by a bowden cable 31, for example, acting against the force of a spring 36 which is located between the arm 29 and the intermediate body 32 fixed to the housing. By selecting the profile of the cam 28 the characteristic of the valve is determined.

FIG. 6 shows a fluid operated drive defined by a double-acting pneumatic cylinder 33 which is connected to the valve housing 1 through an intermediate fitting 35. A plunger 34 transmits the force to the pistons. The position of the plunger 34 may be axially adjusted with respect to the piston rod of the cylinder 33.

The proportional valve is preferably used in a fuel dispensing system to recover fuel vapors emitted. Conventionally, the fuel dispensing line (not shown) comprises an outer tube through which the fuel passes towards the nozzle, and an inner tube through which the fuel vapors are returned to the tank of the gas station. The inlet port 2 of the proportional valve is connected to the inner tube of the fuel line and the outlet port 3 is connected to the gas station tank. The solenoid 17 is controlled in response to the volume of the fuel to be dispensed, in particular the control signal for the solenoid is derived from the fuel meter. Accordingly, the volume of the fuel vapor recovered is proportional to the fuel volume to avoid an unduely high pressurizing of the gas station tank caused by the vapor recovered. As the annular gap defined by the passage 4 and the rod 12 defines a throttle, the fluid volume is limited to a predetermined value, for example, 40 liters per minute.

FIG. 7 shows an arrangement, according to which a proportional valve as shown in FIG. 1 cooperates with a multiple fuel dispensor. The proportional valve is connected to a vapor collecting tube 40, preferably by screw bolts (not shown) extending through the valve housing 1 and screwed into threaded bores (not shown) in the tube 40. Preferably the tube 40 has a rectangular cross-section comprising a pair of opposite flat faces 41, 42. An annular sleeve 43 provided with ring seals 44 centers and seals the inlet opening 2 with respect to the tube 40. It should also be noted that each of the pistons 11 and 13 is sealed with a bellows seal 62, 64.

A plurality of shut-off valves 50 is mounted to the opposite flat side 42 of the tube 40, of which one valve only is shown in FIG. 7. Each shut-off valve 50 is a two-port/-two-directional seat valve including a valve housing 51, an inlet port 52, and inlet port 53, a valve member 54, a seal 55 for the valve member and a spring 56 biasing the valve member into the closing position.

Corresponding to the structure of the proportional valve, the valve housing 51 is spaced from the solenoid 58 by an intermediate body 57 having bleeding openings 59. The solenoid 58 is defined by a switching solenoid which opens the valve when receiving an electrical input signal to connect a vapor recovery line (not shown) from a fuel nozzle connected to the inlet opening 52, to the outlet opening 53 and the vapor collecting tube 40.

It should be specifically noted that the vapor line coming from the fuel nozzle opens into the valve chamber 60 in which the valve plunger is located so that the seal 55 is pressure releaved when the valve is closed since both axial faces of the seal are subjected to atmospheric pressure. This allows to use a simple seal and reduces the friction.

A sleeve 46 having a sealing ring 47 is provided to center and seal the valve housing 51. Mounting the valve housing 51 to the tube 40 is obtained by bolts not shown (extending to the valve housing).

When one of the fuel nozzles available to the customers is activated, the associated shut-off valves is opened whereas all other shut-off valves mounted to the tube 40 associated to the other nozzles are blocked. In addition, the fuel dispension therethrough is blocked such that the fuel vapor only of the fuel nozzle to be activated passes through the open shut-off valve associated thereto into the tube 40 and therefrom through the proportional valve which is controlled to return the vapor volume via the outlet port to a vacuum pump and from the pump to the fuel tank of the gas station.

I claim:

1. A proportional valve comprising a valve housing including an inlet and an outlet port, a valve member associated with a through-opening between the inlet and outlet port, a controllable actuating means acting on said valve member against the force of a resetting means to control the opening and closing of said through-opening, characterized in that said valve member is defined by a linearly moving tandem piston arrangement including a pair of pistons (11,13) which are slidably guided in bores (6,7) of the valve housing (1) in alignment with respect to each other and which are connected by a connecting rod (12) extending through said through-opening (4), the fluid path in said through-opening is throttled by said linear movement of said tandem piston arrangement in order to limit the maximum flow rate therethrough, the piston heads facing away from each other being subjected to atmosphere, and the piston heads facing each other being subjected to the fluid to be controlled.

2. The proportional valve of claim 1, wherein the tandem piston arrangement is connected through a force transmitting member (18) to a replaceable drive means which is one of an electromagnetical drive means or a mechanical drive means or a fluid operated drive means.

3. The proportional valve of claim 2, wherein the valve housing (1) and the drive means are separated from each other by an intermediate body (16) accommodating the driving connection between the force transferring member (18) and the tandem piston arrangement (11,13) and to which the drive means is removably connected.

4. The proportional valve a proportional valve comprising a valve housing including an inlet and an outlet port, a valve member associated with a through-opening between the inlet and outlet port, a controllable actuating means acting on said valve member against the force of a resetting means to control the opening and closing of said through-opening, characterized in that said valve member is defined by a linearly moving tandem piston arrangement including a pair of pistons (11,13) which are slidably guided in bores (6,7) of the valve housing (1) in alignment with respect to each other and which are connected by a connecting rod (12) extending through said through-opening (4), the fluid path in said through-opening is throttled by said linear movement of said tandem piston arrangement in order to limit the maximum flow rate therethrough, the piston heads facing away from each other being subjected to atmosphere, and the piston heads facing each other being subjected to the fluid to be controlled, said tandem piston arrangement being connected through a force transmitting member (18) to a replaceable drive means which is one of an electromagnetical drive means or a mechanical drive means or a fluid operated drive means, said valve housing (1) and the drive means being separated from each other by an intermediate body (16) accommodating the driving connection between the force transferring member (18) and the tandem piston arrangement (11,13) and to which the drive means is removably connected, and the intermediate body (16) including opening (16a) connecting the inner space of the intermediate body to atmosphere.

5. The proportional valve of claim 1, wherein both cylindrical pistons have the same diameter such that the fluid engaged faces are equal.

6. The proportional valve of claim 1, wherein each of said pistons is sealed with respect to its associated bore by a resilient or, respectively, lubricated seal (10).

7. The proportional valve of claim 1, wherein said tandem piston arrangement is moved towards closing by the resetting force and towards opening by the drive means, wherein the piston remote of said drive means is defined to be a blocking member to controllable opening and closing said through-opening.

8. The proportional valve of claim 8, wherein the resetting force is produced by a spring (15) which is supported on the valve housing and engages an annular flange (14) of the piston facing said drive means.

9. The proportional valve of claim 1, wherein said inlet and outlet ports are formed as bores laterally with respect to each other, with said axes being normal to the longitudinal axes of the piston arrangement, and said port being connected to each other by the through-opening.

10. The proportional valve of claim 7, wherein a seal is provided for the head face of one of said piston facing said through-opening which seal cooperates with a valve seat (37) encircling said through-opening.

11. The proportional valve of claim 1, wherein said connecting rod and the through-opening are provided with a sealing face each which sealingly engage each other in the closing position of the tandem piston arrangement to close said through-opening.

12. The proportional valve of claim 1, wherein both pistons are sealed by a bellow (62,64) each.

13. A fuel delivery system for recovering the fuel vapors in a fuel delivery line to a fuel tank, comprising a proportional valve having a valve housing including an inlet and an outlet port, a valve member associated with a through-opening between the inlet and outlet port, a controllable actuating means acting on said valve member against the force of a resetting means to control the opening and closing of said through-opening, characterized in that said valve member is defined by a linearly moving tandem piston arrangement including a pair of pistons (11,13) which are slidably guided in bores (6,7) of the valve housing (1) in alignment with respect to each other and which are connected by a connecting rod (12) extending through said through-opening (4), the fluid path in said through-opening is throttled by said linear movement of said tandem piston arrangement in order to limit the maximum flow rate therethrough, the piston heads facing away from each other being subjected to atmosphere, and the piston heads facing each other being subjected to the fluid to be controlled.

14. The system of claim 13, wherein said fuel delivery line comprises an outer tube and a coaxial inner tube, wherein the inlet port of said proportional valve is connected to the inner tube recovering the fuel vapor and the outlet port of the valve is connected to the fuel tank and wherein the actuating means is controlled in response to the volumetric flower rate of the fuel flowing in the fuel line.

15. The system of claim 14, wherein a plurality of vapor recovery lines is connected to a gas collecting tube (40) through a shut-off valve (50) each and wherein said proportional valve is provided bet-ween said vapor collecting tube and said fuel tank.

16. The system of claim 15, wherein said vapor collecting tube comprises a pair of opposed flat faces (41,42) and wherein the shut-off valves are mounted one adjacent the other on the one flat side and the proportional valve is mounted on the opposite flat side.

17. The system of claim 16, wherein inserts (43,46) are provided for centering and sealing said shut-off valves and the proportional valve which inserts extend into the inlet and outlet opening of the valves and associated bore of the vapor collecting tube.

18. The system of claim 16, wherein an intermediate body (57) is provided between the solenoid (58) and the valve housing (51) of said shut-off valves and wherein said intermediate body is provided with bleed openings (58).

* * * * *

UNITED STATES PATENT AND TRADEMARK OFFICE
CERTIFICATE OF CORRECTION

PATENT NO. : 5,267,721  Page 1 of 2

DATED : December 7, 1993

INVENTOR(S) : Wilfried Stroh

It is certified that error appears in the above-indentified patent and that said Letters Patent is hereby corrected as shown below:

Column 1, line 29, after "for" insert --the--.

Column 2, line 28, "diagramm" should be --diagram--.

Column 2, line 31, "diagramm" should be --diagram--.

Column 2, line 40, "FIG." should be --FIGS.--.

Column 2, line 58, "lubricate" should be --lubricant--.

Column 3, line 57, "accomodated" should be --accommodated--.

Column 4, line 3, "diagramm" should be --diagram--.

Column 4, line 41, "unduley" should be --unduly--.

Column 5, line 10, "releaved" should be --relieved--.

Column 5, line 62, Claim 4, delete "proportional valve a".

Column 6, line 37, Claim 8, "8" (second occurrence) should be --7--.

Column 6, line 45, Claim 9, "port" should be --ports--.

Column 7, line 17, Claim 14, "flower" should be --flow--.

UNITED STATES PATENT AND TRADEMARK OFFICE
CERTIFICATE OF CORRECTION

PATENT NO. : 5,267,721
DATED : December 7, 1993
INVENTOR(S) : Wilfried Stroh

It is certified that error appears in the above-indentified patent and that said Letters Patent is hereby corrected as shown below:

Column 8, line 2, Claim 15, "bet-ween" should be --between--.

Signed and Sealed this

Fifth Day of July, 1994

Attest:

BRUCE LEHMAN

Attesting Officer     Commissioner of Patents and Trademarks